Dec. 3, 1968    J. N. ROSEKRANS, JR., ET AL    3,414,284

SLED

Filed June 22, 1966

INVENTOR.
JOHN G. BOWES
JOHN N. ROSEKRANS, JR.

Naylor & Neal
ATTORNEYS 3,414,284
SLED
John N. Rosekrans, Jr., and John G. Bowes, San Francisco, Calif., assignors to Kransco Manufacturing, Inc., San Francisco, Calif., a corporation of California
Filed June 22, 1966, Ser. No. 559,615
2 Claims. (Cl. 280—21)

ABSTRACT OF THE DISCLOSURE

A sled comprising a body of generally tub-shaped configuration having drag devices secured thereto to effect its braking and steering. The drag devices comprise wings mounted at the rear and to either of the body for selective and independent depression into engagement with a medium on which the body is supported. Resilient connections between the body and the respective wings normally maintain the wings elevated from engagement with a medium on which the body is supported.

---

The present invention relates to a sled for use on a sliding support medium such as snow or water. The invention is especially concerned with a sled provided with improved steering and braking controls.

Prior art sleds have not provided simple and effective control structure which may be operated to turn the sled in any direction of travel or, alternatively, to slow the sled down without causing deviation from the desired direction. This deficiency has resulted in inexpensive sleds being produced without control means by which the sled may be slowed down without causing a deviation from a desired line of travel. Thus, inexpensive sleds typically can only be stopped or slowed down by dragging of the user's limbs, or by turning the sled into the hill. This limitation renders the sleds hazardous to use and, to a large extent, destroys their maneuverability. Of course, the producers of the more expensive sleds have solved this problem by providing a separate braking means but this adds materially to the cost of the sled and, hence, is unavailable on the sleds generally used by children.

It is, accordingly, a principal object of the present invention to provide a sled incorporating improved control structure through which the sled may be either turned in any direction or, alternatively, slowed down without causing a deviation from the desired line of travel.

Another object of the invention is to provide a sled which may be produced in an inexpensive manner. With respect to this object, it is a further object of the invention to provide a unitary sled structure well suited for forming from modern plastic materials through vacuum forming techniques.

Yet another object of the invention is to provide a sled having drag devices adapted to effect optimum braking and/or steering.

Still another object of the invention is to provide a steerable sled having improved characteristics of safety and stability.

In its broader aspects, the sled of the present invention comprises: a body having support area for carrying one or more individuals; support structure on said body adapted to ride on a support medium, such as snow; and, control structure comprising drag devices flexibly secured, respectively, to opposite sides of the body for selective engagement with a sliding medium on which the sled is supported either independently or simultaneously. It is through operation of the latter devices, as will be seen from the subsequent discussion, that steering and braking control of the sled is effected.

The detailed structure and operation of the invention and the foregoing and other objects will be more apparent when viewed in the light of the accompanying drawings, wherein.

Figure 1:
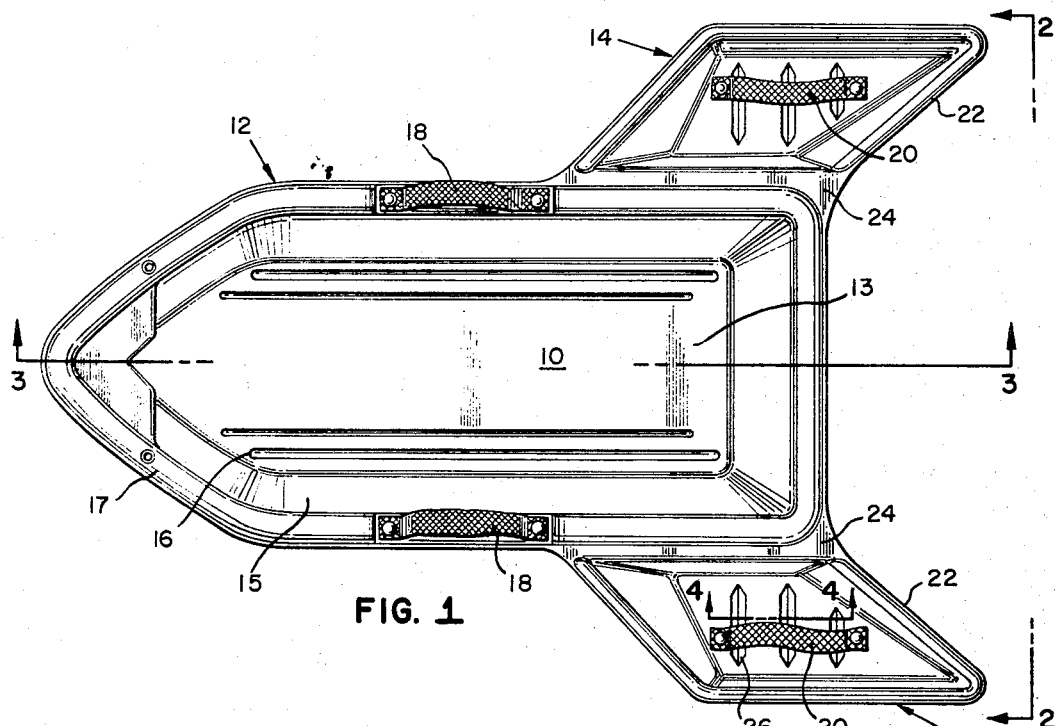
FIG. 1 is a top plan view illustrating a preferred embodiment of the inventive sled.
Figure 2:
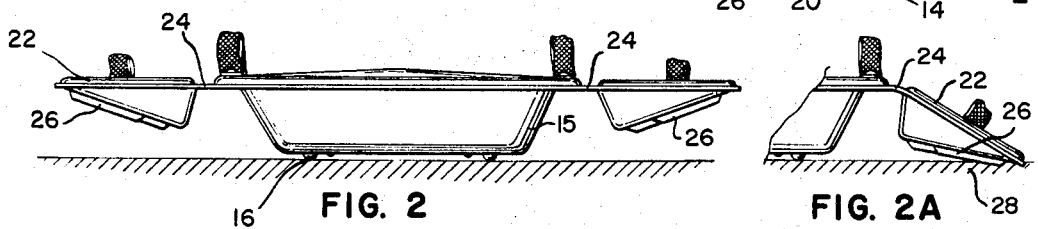
FIG. 2 is a rear elevational view taken along the plane designated by line 2—2 of FIG. 1 showing the brakes in an elevated at rest position.
Figure 2A:
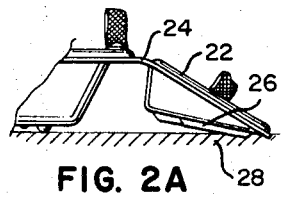
Figure 3:
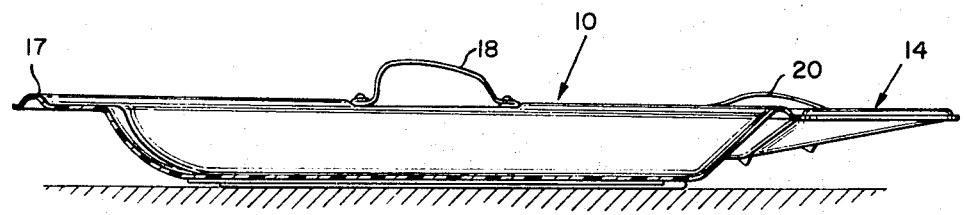
Figure 4:

FIG. 2–A is a partial rear elevational view, similar to FIG. 2, showing a brake in an engaged position;

FIG. 3 is a sectional view taken along the plane designated by line 3—3 of FIG. 1;

FIG. 4 is a sectional view taken along the plane designated by line 4—4 of FIG. 1.

Referring to FIG. 1, a preferred embodiment of the sled is designated therein in its entirety by numeral 10. The sled 10 basically comprises: a body 12 adapted to carry one or more individuals; a pair of brakes 14 mounted on opposite sides of and at the rear of the body 12; runners 16 formed on the bottom of the body 12 to provide riding stability; a first pair of hand grips 18 mounted on opposite sides of and at the middle of the body 12; and, a second pair of hand grips 20 mounted on the brakes 14. The body 12 comprises an elongated essentially pan-shaped structure having a bottom 13 with a contiguous upwardly extending wall 15 fixed thereto and extending therearound. The wall 15 has a boundary lip portion 17 extending around the upper peripheral edge thereof. It is on the latter portion that the grips 18 and the brakes 14 are mounted.

The inner and outer surfaces of the bottom 13 define, respectively, a support area for carrying an individual, or individuals, using the sled and the surface of the sled which rides over the support mediuim (see FIG. 2). Individuals riding in the sled normally sit upright on the bottom 13 with their feet extending forwardly (i.e. to the left as viewed in FIG. 1) and their hands clasped on the strap type grips 18 and 20. When two individuals ride in the sled, the forward individual clasps the grips 18 and the rearward individual clasps the grips 20. When one individual rides the sled, he or she preferably clasps the grips 20.

The illustrated embodiment of the inventive sled is comprised of a unitary continuous sheet and, thus, is well facilitated for manufacture by modern and relatively inexpensive techniques. For example, the sled may be vacuum molded from any number of durable plastic materials presently available.

Referring now to FIGS. 2, 2–A, 3, and 4, therein it can be seen that the continuous sheet structure of the present invention provides for the mounting and fabrication of the brakes or drag devices 14. Specifically, the brakes 14 are comprised of relatively rigid dish-shaped wings 22 flexibly secured to the body 12 by thin resilient sections 24. Through the flexible connection of the brakes 14 to the body 12 provided by the resilient sections 24, the brakes 14 are normally maintained in an elevated position and may be selectively bent downwardly from the elevated at rest position to an engaged braking position. These alternative positions are represented in FIGS. 2 and 2–A, respectively, wherein the sled is illustrated as being supported on a relatively flat sliding medium 28.

In the preferred embodiment of the invention illustrated, each of the wings 22 have secured to the upper surface thereof the strap-type grips 20 to facilitate the operation by an individual riding on the sled. This embodiment also includes a substantially planar undersurface provided on the wings 22 and having formed thereon irregularities comprised of downwardly extending ribs 26 disposed substantially perpendicular to the normal direction of travel of the sled. The ribs 26 enhance the drag action of the brakes 14 upon engagement with a support medium. Drag action of the brakes is further optimized by disposing the undersurfaces of the wings 22 at such an inclination that they assume a position substantially parallel to and in contiguous contact with a relatively flat sliding medium on which the sled is supported upon being forced into engagement therewith. The latter characteristic can best be seen from FIG. 2–A.

In operation of the sled 10, the brakes 14 are normally maintained in the elevated position illustrated in FIG. 2 by resilient action of the sections 24 and, thus, present no resistance to movement of the sled. From this normal condition, control of the sled can be effected by selectively urging either one, or simultaneously urging both of the brakes 14 into engagement with the sliding medium on which the sled is supported. This is generally accomplished by the rearmost individual on the sled through shifting of his or her weight to either one or both of the wings 22. When the brakes 14 are engaged independently, the sled 10 is turned towards the side of the engaged brake. Thus, alternative operation of the brakes 14 provides for selective turning of the sled 10. The rearmost mounting of the brakes 14 on the body facilitates this turning. When the brakes 14 are simultaneously engaged to the same degree, the sled is braked without deviating from its normally straight line of travel. Through selectively varying the extent of engagement of either one or both of the brakes 14, any degree of turning, braking, or combined braking and turning may be effected. Accordingly, the brakes 14 provide for simple and effective sled control which may be selectively varied over a wide range.

Thus, in summary the inventive sled has a single means, the brakes 14, which provide it with a high degree of maneuverability. In addition, the characteristics of the sled render it suitable for manufacture by modern and inexpensive techniques.

It is to be understood that the invention is not intended to be limited to the specific embodiment illustrated and described, but rather is defined by the following claims.

We claim:
1. A sled for use on a sliding medium, comprising:
 (a) a relatively rigid body formed of a continuous sheet of material, said body having a support area for carrying one or more individuals;
 (b) support means on the body adapted to ride on a sliding medium; and,
 (c) drag devices comprising wings extending, respectively, laterally from opposite sides of the body in positions normally elevated from engagement with a sliding medium on which the sled is supported; said wings each:
  (1) being formed of the same continuous sheet of material from which said body is formed;
  (2) being secured, respectively, to said body through a thin section of said material adapted to resiliently bend to permit deflection of said wings downwardly to effect selective engagement thereof, either independently or simultaneously, with a sliding medium on which said sled is supported; and
  (3) including operating means whereby an individual carried on the body may manually deflect said wings downwardly to effect said engagement.
2. A sled according to claim 1, wherein:
 (a) said body is of an elongated configuration having forward and rear end portions; and,
 (b) said wings extend laterally from the rear end portion of said body.

References Cited

UNITED STATES PATENTS

| | | | |
|---|---|---|---|
| D. 201,815 | 8/1965 | Greenberg | D34—15 |
| 414,459 | 11/1889 | Thomas | 280—12.11 |
| 1,077,082 | 10/1913 | Kliment. | |

BENJAMIN HERSH, *Primary Examiner.*

J. SIEGEL, *Assistant Examiner.*